US007875350B2

(12) United States Patent
Matsumoto et al.

(10) Patent No.: US 7,875,350 B2
(45) Date of Patent: Jan. 25, 2011

(54) ETHYLENE POLYMER PARTICLE HAVING SPECIFIC INTRINSIC VISCOSITY AND CRYSTALLINITY, PRODUCTION METHOD THEREOF AND MOLDED ARTICLE USING THE SAME

(75) Inventors: Tetsuhiro Matsumoto, Iwakuni (JP); Tetsunori Shinozaki, Otake (JP); Yasushi Nakayama, Ichihara (JP); Kunihiko Mizumoto, Chiba (JP); Satoshi Akiyama, Ichihara (JP); Toshiyuki Tsutsui, Otake (JP)

(73) Assignee: Mitsui Chemicals, Inc., Minato-Ku, Tokyo (JP)

( * ) Notice: Subject to any disclaimer, the term of this patent is extended or adjusted under 35 U.S.C. 154(b) by 598 days.

(21) Appl. No.: 11/878,610

(22) Filed: Jul. 25, 2007

(65) Prior Publication Data
US 2008/0090081 A1 Apr. 17, 2008

(30) Foreign Application Priority Data
Jul. 25, 2006 (JP) .............................. 2006-202324

(51) Int. Cl.
*C08F 4/10* (2006.01)
*C08F 4/12* (2006.01)
*C08F 4/16* (2006.01)

(52) U.S. Cl. .................... 428/402; 526/90; 526/102; 526/123.1

(58) Field of Classification Search ................ 428/402, 428/327; 526/72, 89, 173, 176, 182, 221, 526/237, 352, 909, 90, 102, 123.1
See application file for complete search history.

(56) References Cited

U.S. PATENT DOCUMENTS

| | | | | |
|---|---|---|---|---|
| 4,321,347 A | * | 3/1982 | Beach et al. | 526/151 |
| 4,584,347 A | * | 4/1986 | Harpell et al. | 525/119 |
| 5,225,458 A | * | 7/1993 | Bailly et al. | 523/220 |
| 5,352,732 A | * | 10/1994 | Howard | 524/789 |
| 5,650,451 A | * | 7/1997 | Yagi et al. | 521/143 |
| 5,684,124 A | * | 11/1997 | Howard et al. | 528/481 |
| 6,136,936 A | * | 10/2000 | Dall'Occo et al. | 526/348.6 |
| 6,455,659 B1 | * | 9/2002 | Kuramoto et al. | 526/351 |

(Continued)

FOREIGN PATENT DOCUMENTS

EP 0 410 384 1/1991

(Continued)

OTHER PUBLICATIONS

Extended European Search Report issued in corresponding European Patent Application No. 07 79 1177 dated Mar. 16, 2010.

*Primary Examiner*—H. (Holly) T Le
(74) *Attorney, Agent, or Firm*—Buchanan Ingersoll & Rooney PC (57) ABSTRACT

Ethylene polymer particles having an intrinsic viscosity [η] of 5 dl/g to 30 dl/g, a degree of crystallinity of as high as 80% or more, and a specific shape on the surface of the particles. The ethylene polymer particles can be obtained by carrying out polymerization of olefins including ethylene using an olefin polymerization catalyst containing a solid titanium catalyst component including magnesium, halogen and titanium under specific conditions. The ethylene polymer particles obtained by a solid phase method, such as solid phase drawing molding, are capable of providing a molded article with high strength.

8 Claims, 1 Drawing Sheet

U.S. PATENT DOCUMENTS

| | | | |
|---|---|---|---|
| 6,583,237 B1 * | 6/2003 | Imuta et al. | 526/89 |
| 6,962,890 B2 * | 11/2005 | Matsukawa et al. | 502/155 |
| 7,358,322 B2 * | 4/2008 | Jernigan et al. | 528/271 |
| 7,601,423 B2 * | 10/2009 | Nakayama et al. | 428/402 |
| 2004/0048993 A1 * | 3/2004 | Ishihama et al. | 526/160 |
| 2006/0287449 A1 * | 12/2006 | Miyamoto et al. | 526/160 |

FOREIGN PATENT DOCUMENTS

| | | |
|---|---|---|
| JP | 60-158205 A | 8/1985 |
| JP | 2004-107380 A | 4/2004 |

* cited by examiner

FIG. 1

ETHYLENE POLYMER PARTICLE HAVING SPECIFIC INTRINSIC VISCOSITY AND CRYSTALLINITY, PRODUCTION METHOD THEREOF AND MOLDED ARTICLE USING THE SAME

TECHNICAL FIELD

The present invention relates to ethylene polymer particles having extremely high molecular weight, high degree of crystallinity and a specific surface shape. Further, the present invention relates to a molded article obtained by using the ethylene polymer particles.

BACKGROUND ART

So-called ultrahigh molecular weight ethylene polymers, which have extremely high molecular weight, are excellent in impact resistance, abrasion resistance, chemical resistance, strength and the like, as compared with general-purpose ethylene polymers, and thus have excellent characteristics as engineering plastics.

Such ultrahigh molecular weight ethylene polymers are known to be obtained by using publicly known catalysts such as so-called Ziegler catalysts composed of a halogen-containing transition metal compound and an organometallic compound, and magnesium compound supported catalysts as described in JP03130116A (Patent Document 1), and JP07156173A (Patent Document 2). Recently, in terms of production efficiency and the like, ultrahigh molecular weight ethylene polymers are usually produced using highly active catalysts such as magnesium compound supported catalysts and the like.

On the other hand, it is said that ultrahigh molecular weight ethylene polymers are not suited for melt molding, which is a general resin molding method, because of their high molecular weight. For this reason, molding methods have been developed such as a method in which an ultrahigh molecular weight ethylene polymer is gelled and then molded, and a solid phase drawing method in which ultrahigh molecular weight ethylene polymer particles are bonded by pressure with each other at a temperature of not more than the melting point, and are then drawn. Such methods are described in Patent Document 2, JP09254252A (Patent Document 3), JP63041512A (Patent Document 4), and JP63066207A (Patent Document 5) and the like.

Patent Document 1: Japanese Patent Application Laid-Open No. H3-130116 (JP03130116A)

Patent Document 2: Japanese Patent Application Laid-Open No. H7-156173 (JP07156173A)

Patent Document 3: Japanese Patent Application Laid-Open No. H9-254252 (JP09254252A)

Patent Document 4: Japanese Patent Application Laid-Open No. S63-41512 (JP63041512A)

Patent Document 5: Japanese Patent Application Laid-Open No. S63-66207 (JP63066207A)

DISCLOSURE OF THE INVENTION

Problem to be Solved by the Invention

Specific molding methods using polymer particles such as the solid phase drawing method and the like, are said to have a problem that the resultant molded article has relatively low strength since the polymer particles are bonded by pressure at a temperature of not more than the melting point of the particles. In order to solve this problem, ethylene polymer particles with high degree of crystallinity and high heat of fusion are required.

Means to Solve the Problem

Conventionally, it is said that ethylene polymer particles with less surface irregularity are suitable for the solid phase drawing molding. However, the inventor shave found that polymer particles with a specific shape having significant irregularity on the surface are capable of solving the problem since such irregularity increases contact points and contact areas when the particles come into contact, and have also found that ethylene polymer particles with high degree of crystallinity are suitable for the solid phase drawing molding, leading to completion of the present invention.

That is, the present invention provides fine ethylene polymer particles having:

(I) an intrinsic viscosity [η] in the range of 5 dl/g to 30 dl/g,
(II) a degree of crystallinity of 80% or more, and
(III) a shape with a breadth of 0.1 μm to 3 μm and a length of 2 μm to 20 μm on the surface of the particles, and a method for producing the same.

Also, the present invention provides a molded article obtained by using the ethylene polymer particles. Further, the present invention provides the molded article by a solid phase drawing method.

Effect of the Invention

The ethylene polymer particles of the present invention have extremely high molecular weight, high degree of crystallinity, and a specific surface shape. The ethylene polymer particles can give a molded article of high strength by, for example, solid phase drawing molding.

BEST MODE FOR CARRYING OUT THE INVENTION (Ethylene Polymer Particles)

In the present invention, copolymerization may be called polymerization, and a copolymer may be called a polymer, in some cases. An ethylene polymer having an intrinsic viscosity [η] of 5 dl/g or more may be referred to as an ultrahigh molecular weight ethylene polymer, in some cases.

The ultra high molecular weight ethylene polymer particles satisfy the following conditions:

(I) the intrinsic viscosity [η] is in the range of 5 dl/g to 30 dl/g,
(II) the degree of crystallinity is 80% or more, and
(III) the particle surface has a shape with a breadth of 0.1 μm to 3 μm and a length of 2 μm to 20 μm.

The intrinsic viscosity is a value measured at 135° C. in decalin. The intrinsic viscosity [η] is preferably 8 dl/g to 25 dl/g, more preferably 10 dl/g to 25 dl/g, further preferably 15 dl/g to 25 dl/g.

The degree of crystallinity is 80% or more, preferably 80% to 90%, more preferably 80% to 88%. The degree of crystallinity is a value measured by X-ray crystal analysis using RINT2500 type apparatus manufactured by Rigaku Corporation.

The ultrahigh molecular weight ethylene polymer particles of the present invention are suitable for solid-phase drawing molding as described later. In the case of molding an ultrahigh molecular weight ethylene polymer at a temperature not more than the melting point as in the solid-phase drawing molding, the proportions of crystalline portions and amorphous portions and the mutual entangling of molecules are believed to be significant factors that determine moldability.

As described above, the ethylene polymer particles with high degree of crystallinity are believed to contribute to high strength of a solid-phase drawing molded article. The ethylene polymer particles with high degree of crystallinity show small change in degree of crystallinity in the solid-phase drawing molding which is performed at a relatively high temperature; thus, there is a tendency of scarce strain and deformation such as volume constriction and the like. This is estimated as one reason for the excellent moldability of the ethylene polymer particles of the present invention.

The ultrahigh molecular weight ethylene polymers of the present invention include a homopolymer of ethylene, and crystalline copolymers mainly composed of ethylene obtained by copolymerizing ethylene with a small amount of α-olefins, for example, propylene, 1-butene, 4-methyl-1-pentene, 1-pentene, 1-hexene, 1-octene and 1-decene. In terms of increasing the degree of crystallinity and in terms of drawability in the solid-phase drawing molding described later, the homopolymer of ethylene is preferable. Although homopolymerization of ethylene may result in an giving ultrahigh molecular weight ethylene polymer having a branched structure depending on an olefin polymerization catalyst used, it is preferable that the ultrahigh molecular weight ethylene polymer particles of the present invention do not have such a branch.

The ultrahigh molecular weight ethylene polymer particles as described above may be combined with various publicly known stabilizers according to demands. Examples of such stabilizers include heat stabilizers such as tetrakis[methylene (3,5-di-t-butyl-4-hydroxy)hydrocinnamato]methane and distearyl thiodipropionate, and weathering stabilizers such as bis(2,2',6,6'-tetramethyl-4-piperidine) sebacate and 2-(2-hydroxy-t-butyl-5-methylphenyl)-5-chlorobenzotriazole. Further, inorganic or organic dry colors may be added as a coloring agent. Furthermore, stearates such as calcium stearate known as lubricants, hydrogen chloride absorbers or the like are mentioned as suitable stabilizers.

The ultrahigh molecular weight ethylene polymer particles of the present invention have, on the surface, a shape with a breadth of 0.1 μm to 3 μm, preferably 0.2 μm to 2.5 μm, more preferably 0.2 μm to 1.5 μm, particularly preferably 0.2 μm to 1.0 μm and a length of 2 μm to 20 μm, preferably 3 μm to 18 μm. This shape in the form of so-called filament or pillar can be confirmed by SEM observation. The breadth and length of the filament shape specified in the present invention are determined by performing SEM observation using JSM-6300F type scanning electron microscope apparatus manufactured by JEOL Ltd.

The ultrahigh molecular weight ethylene polymer particles with such a filament or pillar structure have significant irregularity on the surface of the particles and have a larger surface area; thus, there is a tendency that a large contact area is achieved when the ultrahigh molecular weight ethylene polymer particles come into contact with each other. When the mutual contact area of the ethylene polymer particles is large, the particles will be bonded by pressure more easily in the molding by a solid-phase drawing method described later.

The ethylene polymer particles of the present invention preferably have an average particle diameter of 100 μm to 300 μm, and the content of particles with a particle diameter of 355 μm or more is preferably 2 wt % or less. The lower limit of the average particle diameter is preferably 110 μm, more preferably 120 μm, particularly preferably 130 μm. On the other hand, the upper limit is preferably 280 μm, more preferably 260

The larger the average particle diameter of ethylene polymer particles produced by polymerization of ethylene and other olefins used as required is, the more easily polymerization reaction heat remains on the particles; thus, the particles may be partially molten or may be fused together. Such melting and fusion will increase the entangling of polymer chains of ethylene polymer particles. Such increase of the entangling of polymer chains tends to deteriorate drawing performance of a solid-phase drawing molding resin. Therefore, when the average particle diameter exceeds the above-mentioned particle diameter upper limit, moldability in solid-phase drawing may be deteriorated.

When the average particle diameter of the ethylene polymer particles is lower than the above-mentioned particle diameter lower limit, a problem may occur in handling because of charging tendency and the like.

The ethylene polymer particles of the present invention preferably have a content of particles with a particle diameter of 355 μm or more of 1.5 wt % or less, more preferably 1.0 wt % or less.

The presence of bulky particles such as particles having a particle diameter of over 355 μm raises the possibility of inhibition of uniformity of a molded article in production of a solid-phase drawing molded article. For example, in the manufacturing of a compressed sheet as a first stage of production of a drawing molded article described later, a part containing such bulky particles raises the possibility of disturbance of uniformity of the sheet. This poor uniformity portion may trigger breakage of the sheet in a drawing molding process at a second or later stage, and may reduce drawing magnification.

The average particle diameter of the ethylene polymer particles of the present invention is a so-called median diameter, and can be measured by a sieving method in which 6 to 8 sieves of different mesh diameters are superimposed and the particle size distribution of the ethylene polymer particles is measured. When a sieve having a mesh diameter of 355 μm is included in the sieves, the content of the bulky particles can also be measured simultaneously.

[Olefin Polymerization Catalyst]

The ultrahigh molecular weight ethylene polymer particles of the present invention may be produced using known olefin polymerization catalysts without limitation provided that the intrinsic viscosity and shape described above can be realized. It is preferable that the olefin polymerization catalyst is a highly active catalyst which contains a solid catalyst component and by which an ethylene polymer is produced in an amount of 500 g or more per g of the solid catalyst component. It is more preferable to use a catalyst component by which an ethylene polymer is produced in an amount of 1000 g or more, further preferably 2000 g or more per g of the solid catalyst component. Though setting the upper limit of this so-called polymerization activity has no significant meaning, in view of the risk that the produced ethylene polymer can be molten by polymerization reaction heat, the activity is preferably not more than 60000 g polymer/g solid catalyst component, more preferably not more than 30000 g polymer/g solid catalyst component.

Ethylene polymer particles produced with a solid catalyst component are said to be aggregates of ethylene polymer blocks produced at active sites in the solid catalyst component. The highly active solid catalyst as described above has relatively many active sites in the catalyst; thus, the ethylene polymer particles produced with the solid catalyst component are aggregates of more ethylene polymer blocks. Therefore, it is believed that the ethylene polymer particles tend to have a large surface area. Since the solid catalyst has high activity, it is assumed that some of polyolefin molecules are produced through fine pores of the solid catalyst component to form a shape of filament or pillar.

Preferable examples of the olefin polymerization catalyst as described above include olefin polymerization catalysts containing:

[A] a solid titanium catalyst component containing magnesium, halogen and titanium, and

[B] an organometallic compound catalyst component containing a metal element selected from group I, group II and group XIII of the periodic table. Examples of these catalysts will be described in detail below.

[Solid Titanium Catalyst Component [A]]

Examples of the solid titanium catalyst component [A] containing titanium, magnesium, and halogen are described in Patent Document 1 and Patent Document 2, and additionally, in JP56000811A, JP57063310A, JP58083006A, JP03000706A, JP02255810, JP04218509 and the like. Such solid titanium catalyst components can be obtained by the contact with each other of magnesium compounds, titanium compounds and, if necessary, electron donors, each of which will be described below.

<Magnesium Compound>

Specifically mentioned as the magnesium compound are publicly known magnesium compounds such as:

magnesium halides such as magnesium dichloride and magnesium dibromide;

alkoxy magnesium halides such as methoxy magnesium chloride, ethoxy magnesium chloride and phenoxy magnesium chloride;

alkoxy magnesiums such as diethoxy magnesium, diisopropoxy magnesium, dibutoxy magnesium and di-2-ethylhexoxy magnesium;

aryloxy magnesiums such as diphenoxy magnesium; and carboxylates of magnesium such as magnesium stearate.

These magnesium compounds may be used alone or in combination of two or more. These magnesium compounds may be complex compounds or composite compounds with other metals, or mixtures with other metal compounds.

Of these compounds, the magnesium compounds containing halogen are preferable, and the magnesium halides are particularly preferable, and magnesium dichloride is especially preferable. Additionally, alkoxy magnesiums such as diethoxy magnesium are also preferably used. The magnesium compounds also include those derived from other substances, for example, those obtained by contact of organomagnesium compounds such as a Grignard reagent with titanium halides, silicon halides, alcohol halides and the like.

<Titanium Compound>

As the titanium compound, for example, tetra-valent titanium compounds are mentioned which are represented by the general formula (1):

$$Ti(OR)_g X_{4-g} \qquad (1)$$

(in the general formula (1), R represents a hydrocarbon group, X represents a halogen atom, and g is $0 \leq g \leq 4$). Specific examples include:

titanium tetrahalides such as $TiCl_4$, and $TiBr_4$;

alkoxy titanium trihalides such as $Ti(OCH_3)Cl_3$, $Ti(OC_2H_5)Cl_3$, $Ti(O\text{-}n\text{-}C_4H_9)Cl_3$, $Ti(OC_2H_5)Br_3$, and $Ti(O\text{-}iso\text{-}C_4H_9)Br_3$;

alkoxy titanium dihalides such as $Ti(OCH_3)_2Cl_2$, and $Ti(OC_2H_5)_2Cl_2$;

alkoxy titanium monohalides such as $Ti(OCH_3)_3Cl$, $Ti(O\text{-}n\text{-}C_4H_9)_3Cl$, and $Ti(OC_2H_5)_3Br$; and tetraalkoxy titaniums such as $Ti(OCH_3)_4$, $Ti(OC_2H_5)_4$, $Ti(OC_4H_9)_4$, and $Ti(O\text{-}2\text{-}ethylhexyl)_4$.

Of them, the titanium tetrahalides are preferable, and particularly, titanium tetrachloride is preferable. These titanium compounds may be used alone or in combination of two or more.

<Electron Donor>

The solid titanium catalyst component [A] of the present invention may contain a publicly known electron donor or a substituted derivative thereof. Preferable examples of the electron donor include electron donors (a) selected from aromatic carboxylate esters, alicyclic carboxylate esters, and compounds with two or more ether bonds via a plurality of carbon atoms, that is, polyether compounds.

If the solid titanium catalyst component [A] of the present invention contains the electron donor, the molecular weight of the resultant polyolefin can be controlled at high level, and the molecular weight distribution can be controlled, in some cases.

Such aromatic carboxylate esters include aromatic carboxylic acid monoesters such as toluate ester, and aromatic polycarboxylate esters such as phthalate ester. Of them, the aromatic polycarboxylate esters are preferable, and phthalate ester is more preferable. As the phthalate ester, preferable are alkyl phthalate esters such as ethyl phthalate, n-butyl phthalate, isobutyl phthalate, hexyl phthalate, and heptyl phthalate, and particularly preferable is diisobutyl phthalate.

As the polyether compound, more specifically, compounds represented by the following general formula (2) are mentioned.

[Chem. 1]

(2)

In the general formula (2), m is an integer of $1 \leq m \leq 10$, more preferably an integer of $3 \leq m \leq 10$, and $R^{11}$ to $R^{36}$ represent each independently a hydrogen atom or a substituent having at least one element selected from carbon, hydrogen, oxygen, fluorine, chlorine, bromine, iodine, nitrogen, sulfur, phosphorus, boron and silicon.

When m represents 2 or more, a plurality of $R^{11}$s and $R^{12}$s may each be the same or different. Any of $R^{11}$ to $R^{36}$, preferably $R^{11}$ and $R^{12}$ may together form a ring other than a benzene ring.

Partial specific examples of such compounds include bi-substituted dialkoxypropanes such as:

2,2-dicyclohexyl-1,3-dimethoxypropane, 2-methyl-2-isopropyl-1,3-dimethoxypropane, 2-cyclohexyl-2-methyl-1,3-dimethoxypropane, 2-isobutyl-2-methyl-1,3-dimethoxypropane,
2,2-diisobutyl-1,3-dimethoxypropane,
2,2-bis(cyclohexylmethyl)-1,3-dimethoxypropane,
2,2-diisobutyl-1,3-diethoxypropane,
2,2-diisobutyl-1,3-dibutoxypropane,
2,2-di-sec-butyl-1,3-dimethoxypropane,
2,2-dineopentyl-1,3-dimethoxypropane,
2-isobutyl-2-isopropyl-1,3-dimethoxypropane,
2-isopentyl-2-isopropyl-1,3-dimethoxypropane,
2-cyclohexyl-2-cyclohexylmethyl-1,3-dimethoxypropane,
2-methyl-2-n-propyl-1,3-diethoxypropane and
2,2-diethyl-1,3-diethoxypropane, trialkoxyalkanes such as:
2-methoxymethyl-2-methyl-1,3-dimethoxypropane,
2-cyclohexyl-2-ethoxymethyl-1,3-diethoxypropane and
2-cyclohexyl-2-methoxymethyl-1,3-diethoxypropane, dialkoxycycloalkanes such as:
2,2-diisobutyl-1,3-dimethoxycyclohexane,
2-isoamyl-2-isopropyl-1,3-dimethoxycyclohexane,
2-cyclohexyl-2-methoxymethyl-1,3-dimethoxycyclohexane,
2-isopropyl-2-methoxymethyl-1,3-dimethoxycyclohexane,
2-isobutyl-2-methoxymethyl-1,3-dimethoxycyclohexane,
2-cyclohexyl-2-ethoxymethyl-1,3-dimethoxycyclohexane,
2-ethoxymethyl-2-isopropyl-1,3-dimethoxycyclohexane and
2-isobutyl-2-ethoxymethyl-1,3-dimethoxycyclohexane, and the like.

Of them, particularly preferable are
2-isobutyl-2-isopropyl-1,3-dimethoxypropane,
2,2-diisobutyl-1,3-dimethoxypropane,
2-isopentyl-2-isopropyl-1,3-dimethoxypropane,
2,2-dicyclohexyl-1,3-dimethoxypropane,
2,2-bis(cyclohexylmethyl)-1,3-dimethoxypropane,
2-methyl-2-n-propyl-1,3-diethoxypropane and
2,2-diethyl-1,3-diethoxypropane.

These compounds may be used alone or in combination of two or more.

The alicyclic carboxylate ester compound is represented by the following general formula (3).

[Chem. 2]

(3)

In the general formula (3), n is an integer of 5 to 10, preferably 5 to 7, particularly preferably 6. $C^a$ represents a carbon atom.

$R^2$ and $R^3$ represent each independently $COOR^1$ or R, and at least one of $R^2$ and $R^3$ represents $COOR^1$.

Although it is preferable that bonds between carbon atoms in the cyclic skeleton are all single bonds, some single bonds other than $C^a$—$C^a$ bonds in the cyclic skeleton may be substituted with a double bond.

A plurality of $R^1$s represent each independently a monovalent hydrocarbon group having 1 to 20, preferably 1 to 10, more preferably 2 to 8, further preferably 4 to 8, particularly preferably 4 to 6 carbon atoms. Examples of the hydrocarbon groups include ethyl group, n-propyl group, isopropyl group, n-butyl group, isobutyl group, hexyl group, heptyl group, octyl group, 2-ethylhexyl group, decyl group, dodecyl group, tetradecyl group, hexadecyl group, octadecyl group and eicosyl group. Among them, preferable are n-butyl group, isobutyl group, hexyl group and octyl group, and further preferable are n-butyl group and isobutyl group.

A plurality of Rs represent each independently an atom or group selected from a hydrogen atom, hydrocarbon groups having 1 to 20 carbon atoms, halogen atoms, nitrogen-containing groups, oxygen-containing groups, phosphorus-containing groups, halogen-containing groups and silicon-containing groups.

R represents preferably a hydrocarbon group having 1 to 20 carbon atoms. Examples of the hydrocarbon groups having 1 to 20 carbon atoms include aliphatic hydrocarbon groups, alicyclic hydrocarbon groups and aromatic hydrocarbon groups such as methyl group, ethyl group, n-propyl group, iso-propyl group, n-butyl group, iso-butyl group, sec-butyl group, n-pentyl group, cyclopentyl group, n-hexyl group, cyclohexyl group, vinyl group, phenyl group and octyl group. Of them, the aliphatic hydrocarbon groups are preferable, and specifically methyl group, ethyl group, n-propyl group, iso-propyl group, n-butyl group, iso-butyl group and sec-butyl group are preferable.

Rs may mutually bond to form a ring, and the skeleton of the ring formed by the mutual bonding of Rs may contain a double bond. When two or more $C^a$s bonded to $COOR^1$ are contained in the skeleton of the ring, the number of carbon atoms constituting the skeleton of the ring is 5 to 10.

As the skeleton of the ring, a norbornane skeleton, tetracyclododecene skeleton and the like are mentioned.

A plurality of Rs may be carbonyl structure-containing groups such as carboxylate ester groups, alkoxy groups, siloxy groups, aldehyde groups, acetyl groups and the like, and it is preferable that these substituents contain one or more hydrocarbon groups.

Preferable examples of such alicyclic ester compounds include:
3,6-dimethylcyclohexane-1,2-dicarboxylate ester,
3-methyl-6-propylcyclohexane-1,2-dicarboxylate ester,
cyclohexane-1,2-dicarboxylate ester, and the like.

The compounds having diester structures as described above include isomers such as cis and trans isomers with respect to a plurality of $COOR^1$ groups in the general formula (3). Any of the structures exhibits an effect corresponding to the object of the present invention. In terms of polymerization activity and the like, it is preferable that the content of trans isomer is high.

The solid titanium catalyst components to be used in the present invention are roughly classified into a type such that when used as a catalyst for olefin polymerization, the reactivity is high in an initial stage of polymerization reaction but the catalyst is de-activated in a relatively short period of time (initially active type) and a type such that though the reactivity in an initial stage of polymerization reaction is mild, the reaction tends to continue (activity continuing type). As the solid titanium catalyst component of the present invention, the latter activity continuing type will be preferable. The reason for this is that when the reactivity is too high, it will be more likely that the surfaces of the ethylene polymer particles are molten and the particles are fused together as described above. In this regard, preferable among the aromatic carboxylate esters, alicyclic carboxylate esters and ether compounds are aromatic poly-valent esters, alicyclic poly-valent esters and ether compounds, and more preferable are ether compounds. Further, 1,3-diethers are preferable, and particularly, 2-isobutyl-2-isopropyl-1,3-dimethoxypropane, 2,2-diisobutyl-1,3-dimethoxypropane, 2-isopentyl-2-isopropyl-1,3-dimethoxypropane, 2,2-dicyclohexyl-1,3-dimethoxypropane and 2,2-bis(cyclohexylmethyl)-1,3-dimethoxypropane are preferable. Though the reason is unknown, according to experiment results by the inventors, solid titanium catalyst components containing the 1,3-diether compounds tend to give an ultrahigh molecular weight ethylene polymer of high degree of crystallinity.

These electron donors (a) such as the aromatic carboxylate esters, alicyclic carboxylate esters and ether compounds may be used alone or in combination of two or more. The electron donor may be formed during the preparation of the solid titanium catalyst component [A]. Specifically, in the case where the electron donor is any of the ester compounds, the preparation of the solid titanium catalyst component [A] may include a step in which a carboxylic anhydride or a carboxylic dihalide corresponding to the ester is substantially brought into contact with a corresponding alcohol. By this step, the ester compound is incorporated in the solid titanium catalyst component.

For the preparation of the solid titanium catalyst component [A] to be used in the present invention, publicly known methods can be used without limitation. Specifically, for example, the following methods (P-1) to (P-4) are preferably mentioned.

(P-1) A solid adduct composed of a magnesium compound and an electron donor such as alcohol, is brought into contact with an electron donor (a) and a liquid titanium compound under suspended condition in the presence of an inert hydrocarbon solvent.

(P-2) A solid adduct composed of a magnesium compound and an electron donor such as alcohol, is brought into contact with an electron donor (a) and a liquid titanium compound in several divided operations.

(P-3) A solid adduct composed of a magnesium compound and an electron donor such as alcohol, is brought into contact with an electron donor (a) and a liquid titanium compound under suspended condition in the presence of an inert hydrocarbon solvent in several divided operations.

(P-4) A liquid magnesium compound composed of a magnesium compound and an electron donor such as alcohol, is brought into contact with a liquid titanium compound and an electron donor (a).

The reaction temperature is in the range of preferably –30° C. to 150° C., more preferably –25° C. to 130° C., further preferably –25° C. to 120° C.

Production of the solid titanium catalyst component can also be carried out in the presence of a publicly known solvent if necessary. The solvents include aromatic hydrocarbons such as toluene and o-dichlorotoluene, which have slight polarity, and publicly known aliphatic hydrocarbons and alicyclic hydrocarbon compounds such as heptane, octane, decane and cyclohexane. Among them, the aliphatic hydrocarbons are preferable.

In the solid titanium catalyst component [A] used in the present invention, the halogen/titanium (atom ratio) (namely, mol number of halogen atoms/mol number of titanium atoms) is desirably 2 to 100, preferably 4 to 90.

The magnesium/titanium (atom ratio) (namely, mol number of magnesium atoms/mol number of titanium atoms) is desirably 2 to 100, preferably 4 to 50.

The electron donor (a)/titanium (mol ratio) (namely, mol number of electron donor selected from aromatic carboxylate esters, alicyclic carboxylate esters and polyether compounds/mol number of titanium atoms) is desirably 0 to 100, preferably 0.2 to 10.

[Organometallic Compound Catalyst Component [B]]

The olefin polymerization catalyst contains:
the solid titanium catalyst component [A] according to the present invention, and
an organometallic compound catalyst component [B] containing a metal element selected from group I, group II and group XIII of the periodic table.

As the organometallic compound catalyst component [B], there can be used compounds containing a metal of group XIII, for example, organoaluminum compounds, complex alkylated compounds of a metal of group I and aluminum, organometallic compounds of a metal of group II, and the like. Of them, the organoaluminum compounds are preferable.

The organometallic compound catalyst component [B] is specifically described in the above-described known documents in detail, and examples of such organometallic compound catalyst components [B] include organoaluminum compounds represented by the general formula (4):

$$R^a{}_n AlX_{3-n} \tag{4}$$

(in the general formula (4), $R^a$ represents a hydrocarbon group having 1 to 12 carbon atoms, X represents a halogen or hydrogen, and n is $1 \leq n \leq 3$). In the general formula (4), $R^a$ represents a hydrocarbon group having 1 to 12 carbon atoms, for example, an alkyl group, cycloalkyl group or aryl group. Specific examples include methyl group, ethyl group, n-propyl group, isopropyl group, isobutyl group, pentyl group, hexyl group, octyl group, cyclopentyl group, cyclohexyl group, phenyl group, tolyl group and the like. Of them, trialkylaluminums of the above formula in which n=3, particularly, triethylaluminum, triisobutylaluminum and the like are preferable. These compounds can also be used as a mixture of two or more.

[Catalyst Component [C]]

The olefin polymerization catalyst may contain, if necessary, a publicly known catalyst component [C], together with the organometallic compound catalyst component [B].

Preferable examples of the catalyst component [C] include organosilicon compounds. As this organosilicon compound, for example, compounds represented by the following general formula (5) are mentioned.

$$R^n Si(OR')_{4-n} \tag{5}$$

In the general formula (5), R and R' represent a hydrocarbon group, and n is an integer of 0<n<4. Preferable specific examples of the organosilicon compounds represented by the general formula (5) include vinyltriethoxysilane, diphenyldimethoxysilane, dicyclohexyldimethoxysilane, cyclohexylmethyldimethoxysilane and dicyclopentyldimethoxysilane.

Silane compounds represented by the following general formula (6) described in WO 2004/016662 are also preferable examples of the organosilicon compounds.

$$Si(OR^a)_3(NR^b R^c) \tag{6}$$

In the general formula (6), $R^a$ represents a hydrocarbon group having 1 to 6 carbon atoms. Examples of $R^a$ include unsaturated or saturated aliphatic hydrocarbon groups having 1 to 6 carbon atoms, and particularly preferable examples include hydrocarbon groups having 2 to 6-carbon atoms. Specific examples thereof include methyl group, ethyl group, n-propyl group, iso-propyl group, n-butyl group, iso-butyl group, sec-butyl group, n-pentyl group, iso-pentyl group, cyclopentyl group, n-hexyl group and cyclohexyl group. Among them, ethyl group is particularly preferable.

In the general formula (6), $R^b$ represents a hydrocarbon group having 1 to 12 carbon atoms or hydrogen. Examples of $R^b$ include hydrogen and unsaturated or saturated aliphatic hydrocarbon groups having 1 to 12 carbon atoms. Specific examples thereof include hydrogen atom, methyl group, ethyl group, n-propyl group, iso-propyl group, n-butyl group, iso-butyl group, sec-butyl group, n-pentyl group, iso-pentyl group, cyclopentyl group, n-hexyl group, cyclohexyl group and octyl group. Among them, ethyl group is particularly preferable.

In the general formula (6), $R^c$ represents a hydrocarbon group having 1 to 12-carbon atoms. Examples of $R^c$ include hydrogen and unsaturated or saturated aliphatic hydrocarbon groups having 1 to 12 carbon atoms. Specific examples thereof include methyl group, ethyl group, n-propyl group, iso-propyl group, n-butyl group, iso-butyl group, sec-butyl group, n-pentyl group, iso-pentyl group, cyclopentyl group, n-hexyl group, cyclohexyl group and octyl group. Among them, ethyl group is particularly preferable.

Specific examples of the compounds represented by the general formula (6) include:
dimethylaminotriethoxysilane,
diethylaminotriethoxysilane,
diethylaminotrimethoxysilane,
diethylaminotriethoxysilane,
diethylaminotri-n-propoxysilane,
di-n-propylaminotriethoxysilane,
methyl-n-propylaminotriethoxysilane,
t-butylaminotriethoxysilane,
ethyl-n-propylaminotriethoxysilane,
ethyl-iso-propylaminotriethoxysilane, and
methylethylaminotriethoxysilane.

Other compounds are also useful as the catalyst component [C], with examples including those described above as the aromatic carboxylate esters, alicyclic carboxylate esters and/ or polyether compounds having two or more ether bonds via several carbon atoms which can be used in preparing the solid titanium catalyst component [A].

Among the polyether compounds, 1,3-diethers are preferable, and particularly,
2-isobutyl-2-isopropyl-1,3-dimethoxypropane,
2,2-diisobutyl-1,3-dimethoxypropane,
2-isopentyl-2-isopropyl-1,3-dimethoxypropane,
2,2-dicyclohexyl-1,3-dimethoxypropane,
2,2-bis(cyclohexylmethyl)-1,3-dimethoxypropane,
2-methyl-2-n-propyl-1,3-diethoxypropane and
2,2-diethyl-1,3-diethoxypropane are preferable.

These catalyst components [C] can be used singly or in combination of two or more.

Preferable examples of the olefin polymerization catalysts which can be used in the present invention further include metallocene compounds disclosed in JP2004168744A and the like, and olefin polymerization catalysts which contain an organometallic compound catalyst component and an organometallic complex having as a ligand a phenoxyimine compound as disclosed in JP2000128931A, JP2004646097A, JP2005002244A, JP2005002086A and the like.

The olefin polymerization catalyst of the present invention may contain other components useful for olefin polymerization, if necessary, in addition to the components as described above. As the other components, for example, metal oxides such as silica and the like used mainly as a carrier, antistatic agents, particle aggregating agents, storage stabilizers and the like are mentioned.

[Method for Producing Ethylene Polymer Particles]

The method for producing ethylene polymer particles according to the present invention comprises polymerization of olefins including ethylene using the olefin polymerization catalyst of the present invention. In the present invention, "polymerization" may refer to homopolymerization and copolymerization such as random copolymerization and block copolymerization.

In the method for producing ethylene polymer particles of the present invention, it is also within the scope of the invention to carry out polymerization in the presence of a prepolymerized catalyst, which is obtained by prepolymerization of α-olefin in the presence of the olefin polymerization catalyst of the present invention. This prepolymerization is carried out by prepolymerizing α-olefin in an amount of 0.1 to 1000 g, preferably 0.3 to 500 g, particularly preferably 1 to 200 g per g of the solid catalyst component contained in the olefin polymerization catalyst.

In the prepolymerization, the concentration of the catalyst used may be higher than the catalyst concentration in the system in the polymerization.

It is desirable that the concentration of the solid titanium catalyst component [A] in the prepolymerization is usually 0.001 mmol to 200 mmol, preferably 0.01 mmol to 50 mmol, particularly preferably 0.1 mmol to 20 mmol in terms of titanium atom per liter of a liquid medium.

The amount of the organometallic compound catalyst component [B] in the prepolymerization may be such that a polymer is produced in an amount of 0.1 g to 1000 g, preferably 0.3 g to 500 g per 9 of the solid titanium catalyst component [A]. It is desirable that this amount of the catalyst component [A] is usually 0.1 mol to 300 mol, preferably 0.5 mol to 100 mol, particularly preferably 1 mol to 50 mol per mol of titanium atoms in the solid titanium catalyst component [A].

In the prepolymerization, the catalyst component [C] and other components can also be used if necessary. In this case, these components are used in an amount of 0.1 mol to 50 mol, preferably 0.5 mol to 30 mol, further preferably 1 mol to 10 mol per mol of titanium atoms in the solid titanium catalyst component [A].

In the prepolymerization, an olefin and the catalyst components are added to an inert hydrocarbon medium, and the prepolymerization is carried out under mild conditions.

In this case, specific examples of the inert hydrocarbon medium to be used include aliphatic hydrocarbons such as propane, butane, pentane, hexane, heptane, octane, decane, dodecane and kerosene;

alicyclic hydrocarbons such as cycloheptane, methylcycloheptane, cyclohexane, methylcyclohexane, methylcyclopentane, cyclooctane and methylcyclooctane;

aromatic hydrocarbons such as benzene, toluene and xylene;

halogenated hydrocarbons such as ethylene chloride and chlorobenzene; and mixtures thereof.

Of these inert hydrocarbon media, the aliphatic hydrocarbons are particularly preferably used. When the inert hydrocarbon medium is used, the prepolymerization is preferably carried out in batch mode.

On the other hand, the prepolymerization can be carried out using an olefin itself as a solvent. The prepolymerization can be also carried out in the substantial absence of solvent. In this case, it is preferable to carry out the prepolymerization continuously.

The olefin to be used in the prepolymerization may be the same or different from the olefin which will be used in polymerization described later. Preferred examples include ethylene and propylene.

It is desirable that the temperature in the prepolymerization is in the range of usually −20 to +100° C., preferably −20 to +80° C., further preferably 0 to +40° C.

Next, the polymerization to be carried out after the prepolymerization or carried out without the prepolymerization will be illustrated.

In the polymerization, ethylene is polymerized in the presence of the olefin polymerization catalyst. In addition to ethylene, α-olefins having 3 to 20 carbon atoms, for example, linear olefins such as propylene, 1-butene, 1-pentene, 1-hexene, 1-octene, 1-decene, 1-dodecene, 1-tetradecene, 1-hexadecene, 1-octadecene and 1-eicosene, or branched olefins such as 4-methyl-1-pentene, 3-methyl-1-pentene and 3-methyl-1-butene, may be used together. Of these α-olefins, propylene, 1-butene, 1-pentene and 4-methyl-1-pentene are preferable.

Together with these α-olefins, aromatic vinyl compounds such as styrene and allylbenzene; and alicyclic vinyl compounds such as vinylcyclohexane and vinyl cycloheptane can also be used.

In the present invention, the prepolymerization and the polymerization can be carried out by any of liquid phase polymerization methods such as bulk polymerization, solution polymerization and suspension polymerization, and gas phase polymerization methods.

When the polymerization is slurry polymerization, the inert hydrocarbons used in the prepolymerization can be used as the reaction solvent, and so can olefins which are liquid at the reaction temperature.

In the polymerization in the polymerization method of the present invention, the solid titanium catalyst component [A] is used in an amount of usually 0.0001 mmol to 0.5 mmol, preferably 0.005 mmol to 0.1 mmol in terms of titanium atom per liter of the polymerization volume. The organometallic compound catalyst component [B] is used in an amount of usually 1 mol to 2000 mol, preferably 5 mol to 500 mol per mole of titanium atoms in the prepolymerized catalyst component in the polymerization system. When the catalyst component [C] is used, it is used in an amount of 0.001 mol to 50 mol, preferably 0.01 mol to 30 mol, particularly preferably 0.05 mol to 20 mol based on the organometallic compound catalyst component [B].

If polymerization is carried out in the presence of hydrogen, the molecular weight of the resultant polymer can be controlled. Particularly in the production of the ultrahigh molecular weight ethylene polymer particles of the present invention, it is preferable to carry out the polymerization of ethylene in the presence of hydrogen. Though the reason for this is not clear now, it is assumed that when the polymerization is carried out in the presence of hydrogen, chain transfer reaction with the olefin such as ethylene is suppressed; whereby the resultant ultrahigh molecular weight ethylene polymer particles have a structure in which the molecule is terminated with a saturated bond. The ultrahigh molecular weight ethylene polymer with such structure is stable and will not be denatured during the molding.

In the polymerization in the present invention, the olefin polymerization temperature is usually 20° C. to 200° C., preferably 30° C. to 100° C., more preferably 50° C. to 90° C. The pressure is set at usually ordinary pressure to 10 MPa, preferably, 0.20 MPa to 5 MPa. In the polymerization method of the present invention, the polymerization can be carried out by any of batch-wise mode, semi-continuous mode and continuous mode. Further, the polymerization can be carried out in two or more stages under different reaction conditions. Specifically, it is preferable to produce ethylene polymers under conditions including:

(a) a step in which an ethylene polymer is produced which has an intrinsic viscosity [η] of 2 dl/g or more and less than 10 dl/g, preferably 3 dl/g or more and less than 10 dl/g, more preferably 5 dl/g or more and less than 10 dl/g, and (b) a step in which an ethylene polymer is produced which has an intrinsic viscosity [η] of 5 dl/g or more and 35 dl/g or less, preferably 7 dl/g or more and 33 dl/g or less, more preferably 10 dl/g or more and 33 dl/g or less, particularly preferably 15 dl/g or more and 32 dl/g or less. Here, it is preferable that the intrinsic viscosity [η] of the polymer obtained in the step (a) and the intrinsic viscosity [η] of the polymer obtained in the step (b) are different; further, [η] of the polymer obtained in the step (b) is higher than the intrinsic viscosity [η] of the polymer obtained in the step (a). It is more preferable that the intrinsic viscosity [η] of the ethylene polymer produced in the first stage is lower than the intrinsic viscosities [η] of all the ethylene polymers produced in the second and later stages. Namely, it is preferable that the intrinsic viscosity [η] of the ethylene polymer produced in the first stage is lower than the intrinsic viscosity [η] of the ethylene polymer finally obtained. A preferable range of the intrinsic viscosity [η] of the ethylene polymer produced in the first stage is the same as the range of [η] of the ethylene polymer obtained in the step (a).

The weight ratio of the ethylene polymer produced in the step (a) to the ethylene polymer produced in the step (b) varies depending on the intrinsic viscosities of the polymers. For example, the proportion of the ethylene polymer produced in the step a is 0 to 50 wt %; the proportion of the ethylene polymer produced in the step b is 100 to 50 wt %; and the weight ratio of the ethylene polymer produced in the step a to the ethylene polymer produced in the step b is preferably 5/95 to 50/50, more preferably 10/90 to 40/60, further preferably 15/85 to 40/60. This weight ratio can be determined by a method in which an ethylene absorption amount is measured in each step, or a method in which the resins obtained in the respective steps are sampled in a small prescribed amount, and the resin production amount in each step is calculated from the weight and from the slurry concentration, the content of catalyst components in the resin, and the like.

When ethylene and other optional olefins are polymerized with a catalyst containing a solid titanium catalyst component, the polymerization reaction occurs at catalyst active sites in the solid titanium catalyst component. It is assumed that a polymer produced in an initial stage of the polymerization reaction is localized on the surface of the particles and a polymer produced in a latter stage of the polymerization reaction is localized inside the particles, similarly to the growth of an annual ring. Therefore, in the case of production of ethylene polymers in two or more stages under different reaction conditions, if the intrinsic viscosity [η] of the ethylene polymer produced in the first stage is lower than the intrinsic viscosity [η] of the ethylene polymer produced finally, the inventors believe that there is a high probability that the polymer having relatively lower molecular weight will form the surface of the particles and the particles are easily bonded by pressure mutually in solid phase drawing molding.

The ethylene polymer particles of the present invention can be produced by publicly known polymerization methods such as batch-mode methods and continuous mode methods. In the case of the multi-stage polymerization as described above, it is preferable to adopt batch-mode methods. The ethylene polymer particles obtained by a batch-mode process are believed to show little variation of ethylene polymers obtained in the step a and the step b for every particles and are believed to be advantageous in the mutual bonding by pressure.

The ultrahigh molecular weight ethylene polymer particles thus obtained may be any of homopolymers, random copolymers, block copolymers and the like. Preferably, in terms of easiness of obtaining high degree of crystallinity, the ethylene polymer particles of the present invention are preferably an ethylene homopolymer.

The ultrahigh molecular weight ethylene polymer particles of the present invention may be particles obtained by the polymerization of ethylene in the presence of the olefin polymerization catalyst as described above; however, it is preferable that the particles are obtained via a step in which the particles are subjected to temperatures of 100° C. or higher and not more than the melting point under a gas phase atmosphere. Specific conditions are such that the temperature is 100° C. to 140° C., preferably 105° C. to 140° C., more preferably 110° C. to 135° C., and the time is 15 minutes to 24 hours, preferably 1 to 10 hours, more preferably 1 to 4 hours. Specifically mentioned area method in which the ethylene polymer particles obtained by the polymerization are kept under the above conditions using an oven or the like, and a method in which after the polymerization reaction in the production of the ethylene polymer particles, a drying step or the like is carried out under the above conditions. Via such treatment, the ultrahigh molecular weight ethylene polymer particles achieve higher degree of crystallinity.

In a preferred embodiment, the ethylene polymer particles are obtained via a step under a liquid phase atmosphere under conditions of 90° C. to 140° C., preferably 95° C. to 140° C., more preferably 95° C. to 135° C., further preferably 95° C. to 130° C. for 15 minutes to 24 hours, preferably 1 to 10 hours, more preferably 1 to 4 hours.

The ultrahigh molecular weight ethylene polymer molded article of the present invention is obtained by molding the ultrahigh molecular weight ethylene polymer particles by a publicly known ultrahigh molecular weight polyethylene molding method. The molded article of the present invention tends to be excellent in strength since the ultrahigh molecular weight ethylene polymer has high degree of crystallinity. When the ethylene polymer used is obtained by a multi-stage polymerization method, moldability tends to be excellent; thus, the degree of freedom of the shape of the molded article is expected to increase higher than in conventional methods. Among molded articles of the present invention, a molded article obtained by a solid phase drawing method is particularly preferable.

With respect to conditions for the solid phase drawing method, known conditions described in Patent Documents 3 to 5 and the like can be used without limitation except for use of the ultra high molecular weight ethylene polymer particles. For example, the ethylene polymer particles of the present invention are bonded by pressure under a pressure of 10 MPa or more into a sheet, and the sheet is then drawn under tension at a relatively high temperature, or drawn under pressure applied using a roll or the like. The temperature in this molding is preferably not more than the melting point of the ethylene polymer particles; however, molding at the melting point or higher is permissible provided that melt-flow does not substantially occur.

The drawability of the molded article using the ethylene polymer particles of the present invention and the physical properties of the drawn molded article can be evaluated by the following methods.

(Drawing Magnification)

The ethylene polymer particles are pressed at a temperature of 136° C. and a pressure of 15.2 MPa for 30 minutes to manufacture a sheet with a thickness of about 500 µm, which is then cut into a shape of longitudinal 35 mm×transverse 7 mm.

Separately, a cylindrical high-density polyethylene molded article with its tip formed in the form of convex taper is manufactured, and this molded article is halved along the center axis (hereinafter, referred to as billet).

The cut sheet is sandwiched and fixed between the halved plane faces of the billet.

The billet in this state is passed at a speed of 1 cm/min through a nozzle in the form of concave taper heated at 120° C., and thereby the sheet is compression-drawn. The concave taper shape of the nozzle and the convex taper shape of the billet are correspondent.

The ratio of the cross-sectional areas of the inlet to the outlet of the nozzle is 6:1, and the sheet is drawn to a six-fold of the original length in the longitudinal direction (pre-drawing).

Then, the drawn sheet obtained in the pre-drawing is cut, and set to a tensile tester (manufactured by Instron, universal tester 55R1122 type) so that the chuck clearance is 9 mm. Under conditions of a temperature of 135° C. and a tensile speed of 18 mm/min, the sheet is drawn uniaxially in the same direction as for the pre-drawing until occurrence of fracture.

The second drawing magnification is multiplied by 6 which is the magnification in the pre-drawing to give a value which is evaluated as the drawing magnification.

(Physical Properties)

Based on ASTM standards, the tensile strength and the tensile elastic modulus of the drawn molded article can be measured using a tensile tester (manufactured by Instron, universal tester 55R1122 type).

The ethylene polymer of the present invention is capable of high performance with the drawing magnification of 90-fold or more. The drawing magnification is more preferably 90 to 500-fold, further preferably 100 to 400-fold, particularly preferably 120 to 350-fold, especially 140 to 350-fold.

It is known to those skilled in the art that there is usually a tendency of enhanced strength of a drawn molded article when the drawing magnification is higher. That is, enhanced drawing magnification is advantageous for obtaining a filament or sheet of high strength.

The solid phase drawn molded article of the present invention can be molded at high drawing magnification, and therefore, is expected to have high strength. Since the solid phase drawing molding does not involve a solvent, molding facility is relatively simple and adverse influence on environments is small; therefore, high contribution to society is expected.

EXAMPLES

Next, the present invention will be illustrated based on examples, but it is needless to say that the present invention is not limited to the following examples unless deviating from the gist.

In the following examples, the intrinsic viscosity [η] of ultrahigh molecular weight ethylene polymer particles, the degree of crystallinity thereof and the shape of the particle surface were measured by the following methods.

(Intrinsic Viscosity [η])

Ultrahigh molecular weight ethylene polymer particles were dissolved in decalin and the intrinsic viscosity [η] was measured in decalin at a temperature of 135° C.

(Degree of Crystallinity)

The degree of crystallinity was measured by a wide-angle X-ray diffraction transmission method using the following apparatus and conditions.

X ray crystal analysis apparatus: RINT2500 type apparatus manufactured by Rigaku Corporation X ray source: CuK α

Output: 50 KV, 300 mA

Detector: Scintillation counter

Sample: Polymer particles were used as they were.

Specifically, about 0.002 g of the polymer particles were placed on a rotary sample table mounted on RINT2500 type apparatus manufactured by Rigaku Corporation, and wide-angle X ray diffraction transmission was performed while rotating the sample table at 77 rpm.

From the resultant wide-angle X ray diffraction profile, the degree of crystallinity was calculated.

(Sem Observation)

The ethylene polymer particles were filled in a sample table having a diameter of about 1 cm of JSM-6300F type scanning electron microscope manufactured by JEOL Ltd., and the sample was observed by SEM at room temperature, and a photograph enlarged to 2000-fold was obtained. From the photograph, the presence or absence of a filament structure was confirmed and the breadth and length of the filament structure were measured.

(Average Particle Diameter, and Proportion of Particles with a Particle Diameter of 355 μm or More)

Using seven sieves with mesh diameters of from 45 μm to 850 μm, 5 g of ethylene polymer particles containing extremely small amount of carbon black mixed as an antistatic agent were graded.

Based on the results, the average particle diameter was calculated by measuring the median diameter by an ordinary method.

On the other hand, with respect to the proportion of particles with a particle diameter of 355 μm or more, the same grading as described above was carried out except that a sieve with a mesh diameter of 355 μm was used, and the proportion of the weight of the particles on the sieve based on the total weight of the particles before the grading was calculated. When a sieve with a mesh diameter of 355 μm is used in the grading in the average particle diameter calculation method, the average particle diameter and the proportion of particles with a particle diameter of 355 μm or more can be measured at a time.

(Drawing Magnification)

The ethylene polymer particles were pressed at a temperature of 136° C. and a pressure of 15.2 MPa for 30 minutes to manufacture a sheet with a thickness of about 500 μm, which was then cut into a shape of longitudinal 35 mm×transverse 7 mm.

Separately, a cylindrical high-density polyethylene molded article with its tip formed in the form of convex taper was manufactured, and this molded article was halved along the center axis (hereinafter, referred to as billet).

The cut sheet was sandwiched and fixed between the halved plane faces of the billet.

The billet in this state was passed at a speed of 1 cm/min through a nozzle in the form of concave taper heated at 120° C., and thereby the sheet was compression-drawn. The concave taper shape of the nozzle and the convex taper shape of the billet are correspondent.

The ratio of the cross-sectional areas of the inlet to the outlet of the nozzle was 6:1, and the sheet was drawn to a six-fold of the original length in the longitudinal direction (pre-drawing).

Then, the drawn sheet obtained in the pre-drawing was cut, and set to a tensile tester (manufactured by Instron, universal tester 55R1122 type) so that the chuck clearance was 9 mm. Under conditions of a temperature of 135° C. and a tensile speed of 18 mm/min, the sheet was drawn uniaxially in the same direction as for the pre-drawing until occurrence of fracture (the drawing magnification which could be measured under the above conditions was about 33-fold at maximum). The measurement was repeated 3 to 5 times, and the highest value was adopted as the drawing magnification value.

The second drawing magnification was multiplied by 6 which was the magnification in the pre-drawing to give a value which was evaluated as the drawing magnification (therefore, the drawing magnification which could be measured by this evaluation method was about 200-fold at maximum).

Example 1

Preparation of Solid Titanium Catalyst Component [A1]

75 g of anhydrous magnesium chloride, 280.3 g of decane and 308.3 g of 2-ethylhexyl alcohol were reacted by heating at 130° C. for 3 hours to give a homogeneous solution. Then, into this solution was added 19.9 g of 2-isobutyl-2-isopropyl-1,3-dimethoxypropane. The mixture was stirred at 100° C. for 1 hour.

The homogeneous solution thus obtained was cooled down to room temperature, and then 30 ml of this homogeneous solution was added dropwise to 80 ml of titanium tetrachloride kept at −20° C. with stirring over 45 minutes. After completion of the dropwise addition, the temperature of this mixed liquid was raised up to 110° C. in 6 hours. When the temperature reached 110° C., 0.55 g of 2-isobutyl-2-isopropyl-1,3-dimethoxypropane was added into the mixed liquid, and the mixture was kept at the same temperature for 2 hours with stirring. After completion of the reaction for 2 hours, a solid part was collected by hot filtration, and this solid part was re-suspended in 100 ml of titanium tetrachloride, and then reacted again by heating at 110° C. for 2 hours. After completion of the reaction, a solid part was collected again by hot filtration, and washed sufficiently with decane at 90° C. and hexane until no free titanium compound was detected in the washing solution. The solid titanium catalyst component prepared by the above operation was stored as a decane slurry, and a part of this slurry was dried for the purpose of investigation of the catalyst composition. The solid titanium catalyst component [A1] thus obtained had the following composition: 2.8 wt % of titanium, 17 wt % of magnesium, 58 wt % of chlorine, 19.5 wt % of 2-isobutyl-2-isopropyl-1,3-dimethoxypropane and 1.2 wt % of 2-ethylhexyl alcohol residue.

(Polymerization)

Into a sufficiently nitrogen-purged polymerization vessel having a content volume of 1 liter was added 500 ml of purified heptane at room temperature, and 0.5 mmol of tri-isobutylaluminum as the organometallic compound catalyst component [B1] and 0.005 mmol in terms of titanium atom of the solid titanium catalyst component [A1] were added under an ethylene atmosphere at 78° C. Subsequently, 25 ml of hydrogen was added, and ethylene polymerization was performed at a temperature of 80° C. for 2.5 hours by feeding ethylene at a constant rate of 0.4 liter/min. The pressure during the polymerization was raised up to 0.46 MPa in terms of gauge pressure. After completion of the polymerization, the produced slurry containing a solid formed was filtrated, and the solid was dried under reduced pressure overnight at a temperature of 80° C., and then kept at a temperature of 120° C. for 3 hours. Further, by means of a sieve with a mesh size of 355 μm, particles with a particle diameter of 355 μm or more were removed. The resultant ethylene polymer particles had an intrinsic viscosity [η] of 18.5 dl/g, a degree of crystallinity of 83%, and an average particle diameter of 200 μm. The polymerization activity was 20,600 g/mmol-Ti. Inclusion of particles with a particle diameter of 355 μm or more was not recognized.

Figure 1:
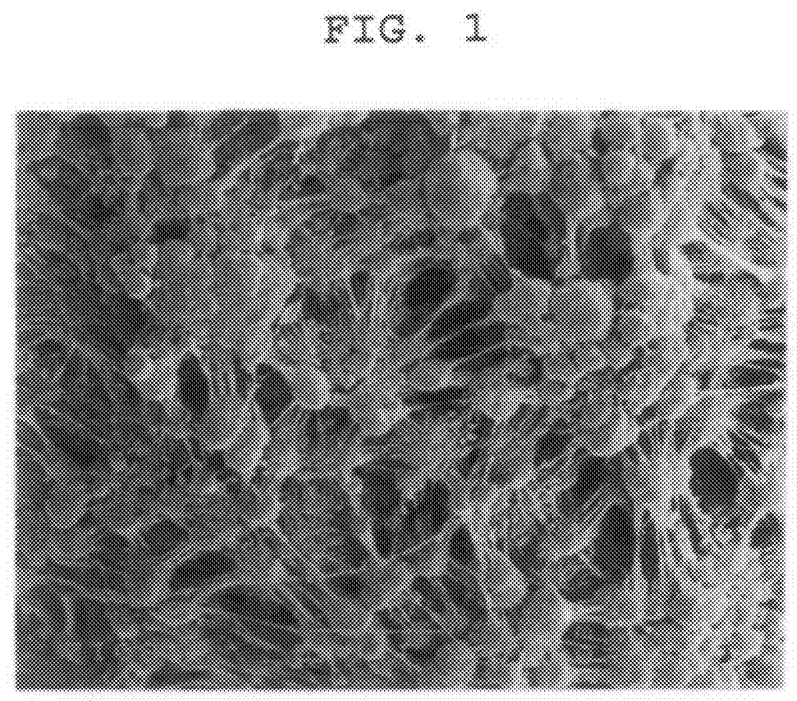
FIG. 1 is a SEM photograph of the ethylene polymer particles of Example 1 according to the present invention.

SEM observation confirmed the presence of a lot of filament shapes mainly having a breadth of 0.3 μm to 0.5 μm and a length of 3 μm to 10 μm on the surfaces of the resultant ethylene polymer particles. A SEM photograph of the surface of one particle is shown in FIG. 1.

The ethylene polymer particles were bonded by pressure at a temperature of 130° C. to manufacture a sheet, and the sheet was drawn to a several-fold in an atmosphere of a temperature of 125° C. No breakage of the sheet was observed.

Further, the drawing magnification was measured, resulting in 99-fold.

Example 2

Polymerization

First step: Into a sufficiently nitrogen-purged polymerization vessel having a content volume of 1 liter was added 500 ml of purified heptane at room temperature, and 0.5 mmol of triisobutylaluminum as the organometallic compound catalyst component [B1] and 0.005 mmol in terms of titanium atom of the solid titanium catalyst component [A1] were added under an ethylene atmosphere at 78° C. Subsequently, 75 ml of hydrogen was added, and then ethylene polymerization was performed at a temperature of 80° C. for 1 hour by feeding ethylene at a constant rate of 0.4 liter/min. At this time point, 10 ml of the slurry was sampled from the polymerization vessel. The slurry was filtrated and the residue was dried to give a white solid. The intrinsic viscosity [η] of this white solid was measured to be 8.5 dl/g.

Second step: After completion of the polymerization, the vessel was purged with ethylene and hydrogen and the pressure was returned to normal pressure. Then, 10 ml of hydrogen was introduced, and ethylene polymerization was carried out at 80° C. for 105 minutes by feeding ethylene at a constant rate of 0.4 liter/min.

After completion of the polymerization, the produced slurry containing a solid formed was filtrated. The solid was dried under reduced pressure overnight at a temperature of 80° C., and further kept at a temperature of 130° C. for 3 hours.

Further, by means of a sieve with a mesh size of 355 μm, particles with a particle diameter of 355 μm or more were removed.

The resultant ethylene polymer particles had an intrinsic viscosity [η] of 23.6 dl/g, a degree of crystallinity of 83%, and an average particle diameter of 210 μm. The polymerization activity was 22,200 g/mmol-Ti. Inclusion of particles with a particle diameter of 355 μm or more was not recognized. The ratio of polymerization amounts in the first step to the second step, first step/second step, was 3/7 by weight, calculated from the weight of the ethylene polymer obtained above, the weight of the ethylene polymer particles sampled in the first step, and the slurry concentration. From these results, the intrinsic viscosity [η] of the polymer produced in the second step was 30.1 dl/g.

SEM observation confirmed the presence of a lot of filament shapes mainly having a breadth of 0.3 μm to 0.5 μm and a length of 3 μm to 10 μm on the surfaces of the resultant ethylene polymer particles.

The ethylene polymer particles were bonded by pressure at a temperature of 130° C. to manufacture a sheet, and the sheet was drawn to a several-fold in an atmosphere of a temperature of 125° C. No breakage of the sheet was observed.

Further, the drawing magnification was measured, resulting in 193-fold.

Example 3

Polymerization

Polymerization was carried out in the same manner as in Example 2 except that the amount of hydrogen was 150 ml and the polymerization time was 48 minutes in the first step and the amount of hydrogen was 20 ml and the polymerization time was 110 minutes in the second step. Further, by means of a sieve with a mesh size of 355 μm, particles with a particle diameter of 355 μm or more were removed.

The resultant ethylene polymer particles had an intrinsic viscosity [η] of 22.2 dl/g, a degree of crystallinity of 83%, and an average particle diameter of 200 μm. The polymerization activity was 19,900 g/mmol-Ti. Inclusion of particles with a particle diameter of 355 μm or more was not recognized.

The polymer obtained in the first step had an intrinsic viscosity [η] of 6.3 dl/g. The ratio of polymerization amounts in the first step to the second step, first step/second step, was 2/8 by weight. The polymer produced in the second step had an intrinsic viscosity [η] of 26.2 dl/g.

SEM observation confirmed the presence of a lot of filament shapes mainly having a breadth of 0.3 μm to 0.5 μm and a length of 3 μm to 10 μm on the surfaces of the resultant ethylene polymer particles.

The ethylene polymer particles were bonded by pressure at a temperature of 130° C. to manufacture a sheet, and the sheet was drawn to a several-fold in an atmosphere of a temperature of 125° C. No breakage of the sheet was observed.

Further, the drawing magnification was measured, and the sheet was found to be drawn to a 200-fold without fracture.

Example 4

Polymerization

Polymerization was carried out in the same manner as in Example 2 except that the amount of hydrogen was 150 ml and the polymerization time was 53 minutes in the first step and the amount of hydrogen was 10 ml and the polymerization time was 107 minutes in the second step. Further, by means of a sieve with a mesh size of 355 μm, particles with a particle diameter of 355 μm or more were removed.

The resultant ethylene polymer particles had an intrinsic viscosity [η] of 21.9 dl/g, a degree of crystallinity of 83%, and an average particle diameter of 200 μm. The polymerization activity was 19,800 g/mmol-Ti. Inclusion of particles with a particle diameter of 355 μm or more was not recognized.

The polymer obtained in the first step had an intrinsic viscosity [η] of 5.0 dl/g. The ratio of polymerization amounts in the first step to the second step, first step/second step, was 3/7 by weight. The polymer produced in the second step had an intrinsic viscosity [η] of 29.1 dl/g.

SEM observation confirmed the presence of a lot of filament shapes mainly having a breadth of 0.3 μm to 0.5 μm and a length of 3 μm to 10 μm on the surfaces of the resultant ethylene polymer particles.

The ethylene polymer particles were bonded by pressure at a temperature of 130° C. to manufacture a sheet, and the sheet was drawn to a several-fold in an atmosphere of a temperature of 125° C. No breakage of the sheet was observed.

Further, the drawing magnification was measured, and the sheet was found to be drawn to a 200-fold without fracture.

Example 5

Polymerization

Polymerization was carried out in the same manner as in Example 2 except that the amount of hydrogen was 300 ml and the polymerization time was 55 minutes in the first step and the amount of hydrogen was 10 ml and the polymerization time was 130 minutes in the second step. Further, by means of a sieve with a mesh size of 355 μm, particles with a particle diameter of 355 μm or more were removed.

The resultant ethylene polymer particles had an intrinsic viscosity [η] of 21.0 dl/g, a degree of crystallinity of 84%, and an average particle diameter of 190 μm. The polymerization activity was 18,800 g/mmol-Ti. Inclusion of particles with a particle diameter of 355 μm or more was not recognized.

The polymer obtained in the first step had an intrinsic viscosity [η] of 2.9 dl/g. The ratio of polymerization amounts in the first step to the second step, first step/second step, was 2/8 by weight. The polymer produced in the second step had an intrinsic viscosity [η] of 25.5 dl/g.

SEM observation confirmed the presence of a lot of filament shapes mainly having a breadth of 0.3 μm to 0.5 μm and a length of 3 μm to 10 μm on the surfaces of the resultant ethylene polymer particles.

The ethylene polymer particles were bonded by pressure at a temperature of 130° C. to manufacture a sheet, and the sheet was drawn to a several-fold in an atmosphere of a temperature of 125° C. No breakage of the sheet was observed.

Further, the drawing magnification was measured, resulting in 173-fold.

Example 6

Polymerization

Polymerization was carried out in the same manner as in Example 3 except that the amount of hydrogen was 15 ml in the second step. A sieve with a mesh size of 378 μm was used instead of the sieve with a mesh size of 355 μm.

The drawing magnification was more than 200-fold, and the proportion of particles with a particle diameter of 355 μm or more was 1.8 wt % of the whole particles.

There were a few sites where irregularity was observed visually on the surface of the pre-drawn sheet. A portion with the irregularity was cut, and this sample of pre-drawn sheet was drawn for the second time. As a result, the sample was fractured at a magnification of 10-fold or less (60-fold or less as total drawing magnification).

The magnification of more than 200-fold was the result of a portion on which surface irregularity was not observed visually.

The results are shown in Table 1.

Example 7

Polymerization

Polymerization was carried out in the same manner as in Example 3. A sieve with a mesh size of 378 μm was used instead of the sieve with a mesh size of 355 μm.

The drawing magnification was more than 200-fold, and the proportion of particles with a particle diameter of 355 μm or more was 4.4 wt % of the whole particles.

There were relatively many sites where irregularity was observed visually on the surface of the pre-drawn sheet. A portion with the irregularity was cut, and this sample of pre-drawn sheet was drawn for the second time. As a result, the sample was fractured at a magnification of 10-fold or less (60-fold or less as total drawing magnification).

The magnification of more than 200-fold was the result of a portion on which surface irregularity was not observed visually.

The results are shown in Table 1.

Example 8

Polymerization

Polymerization was carried out in the same manner as in Example 4. A sieve with a mesh size of 378 μm was used instead of the sieve with a mesh size of 355 μm.

The drawing magnification was more than 200-fold, and the proportion of particles with a particle diameter of 355 μm or more was 6.0 wt % of the whole particles.

There were relatively many sites where irregularity was observed visually on the surface of the pre-drawn sheet. A portion with the irregularity was cut, and this sample of pre-drawn sheet was drawn for the second time. As a result, the sample was fractured at a magnification of 10-fold or less (60-fold or less as total drawing magnification).

The magnification of more than 200-fold was the result of a portion on which surface irregularity was not observed visually.

The results are shown in Table 1.

Comparative Example 1

Preparation of Solid Titanium Catalyst Component [A2]

95.2 g of anhydrous magnesium chloride, 398.4 g of decane and 306 g of 2-ethylhexyl alcohol were reacted by heating at 140° C. for 6 hours to give a homogeneous solution. Then, 17.6 g of ethyl benzoate was added to this solution, and the mixture was stirred at 130° C. for 1 hour.

The homogeneous solution thus obtained was cooled down to room temperature, and then 50 ml of this homogeneous solution was added dropwise to 200 ml of titanium tetrachloride kept at 0° C. with stirring over 1 hour. After completion of the dropwise addition, the temperature of this mixed liquid was raised up to 80° C. in 2.5 hours. When the temperature reached 80° C., 2.35 g of ethyl benzoate was added into the mixed liquid, and the mixture was kept at the same temperature for 2 hours with stirring. After completion of the reaction for 2 hours, a solid part was collected by hot filtration, and this solid part was re-suspended in 100 ml of titanium tetrachloride, and then reacted again by heating at 90° C. for 2 hours. After completion of the reaction, a solid part was collected again by hot filtration, and washed sufficiently with decane at 90° C. and hexane until no free titanium compound was detected in the washing solution. The solid titanium catalyst component [A2] prepared by the above operation was stored as a decane slurry.

(Polymerization)

Into a sufficiently nitrogen-purged polymerization vessel having a content volume of 1 liter was added 500 ml of purified heptane at room temperature, and 0.5 mmol of tri-isobutylaluminum as the organometallic compound catalyst component [B1] and 0.004 mmol in terms of titanium atom of the solid titanium catalyst component [A2] were added under an ethylene atmosphere at 78° C. Subsequently, the temperature was raised up to 80° C., and then ethylene polymerization was carried out for 55 minutes. The pressure during the polymerization was maintained at 0.8 MPa in terms of gauge pressure. After completion of the polymerization, the slurry containing a solid purified was filtrated, and the solid was dried under reduced pressure overnight at 80° C. Further, by means of a sieve with a mesh size of 355 μm, particles with a particle diameter of 355 μm or more were removed.

The resultant ethylene polymer particles had an intrinsic viscosity [η] of 18.6 dl/g, a degree of crystallinity of 77%, and an average particle diameter of 180 μm. The polymerization activity was 32,000 g/mmol-Ti. Inclusion of particles with a particle diameter of 355 μm or more was not recognized.

SEM observation confirmed the presence of a lot of filament shapes mainly having a breadth of 0.3 μm to 0.5 μm and a length of 3 μm to 10 μm on the surfaces of the resultant ethylene polymer particles.

The intrinsic viscosity and degree of crystallinity of the ethylene polymer particles were approximately the same as those of commercially available ultrahigh molecular weight polyethylenes.

The ethylene polymer particles were bonded by pressure at 130° C. to manufacture a sheet, and then the sheet was drawn in an atmosphere of a temperature of 125° C.; however, the sheet was fractured immediately.

Further, the drawing magnification was measured under the above condition, resulting in 29-fold.

INDUSTRIAL APPLICABILITY

The ethylene polymer particles of the present invention have high molecular weight and high degree of crystallinity and have a specific surface shape. They can therefore give a molded article of high strength particularly by solid phase drawing molding. The ethylene polymer particles are suited for solid phase drawing molding.

The invention claimed is:

1. Ethylene polymer particles having:
   (I) an intrinsic viscosity [η] in the range of 5 dl/g to 30 dl/g,
   (II) a degree of crystallinity of 80% or more, and
   (III) a shape with a breadth of 0.1 μm to 3 μm and a length of 2 μm to 20 μm on the surface of the particles.

2. The ethylene polymer particles according to claim 1 wherein the proportion of particles with a particle diameter of 355 μm or more is 2 wt % or less of the total particles and the average particle diameter is 100 μm to 300 μm.

3. The ethylene polymer particles according to claim 1 obtained by reaction of ethylene in an amount of 500 g or more per g of a solid catalyst component.

4. The ethylene polymer particles according to claim 1 obtained by polymerization of olefins including ethylene, in the presence of an olefin polymerization catalyst comprising:
   [A] a solid titanium catalyst component including magnesium, halogen and titanium, and
   [B] an organometallic compound catalyst component including a metal element selected from group I, group II and group XIII of the periodic table; and
   subjecting a polymer obtained by said polymerization of olefins including ethylene to a temperature of not less than 100° C. and not more than a melting point of the polymer.

5. A method for producing the ethylene polymer particles as described in claim 1, comprising a step of polymerizing olefins including ethylene, in the presence of an olefin polymerization catalyst comprising:
   [A] a solid titanium catalyst component including magnesium, halogen and titanium, and
   [B] an organometallic compound catalyst component including a metal element selected from group I, group II and group XIII of the periodic table,

TABLE 1

| | | | First step | | Whole | | Proportion of | |
| --- | --- | --- | --- | --- | --- | --- | --- | --- |
| | Polymerization activity g/mmol-Ti | Degree of crystallization % | Intrinsic viscosity [η] dl/g | Proportion of polymerization amount wt % | particles Intrinsic viscosity [η] dl/g | Average particle diameter D50 μm | particles with a particle diameter of 355 μm or more wt % | Drawing magnification -fold |
| Example 1 | 20,600 | 83 | — | — | 18.5 | 200 | 0 | 99 |
| Example 2 | 22,200 | 83 | 8.5 | 30 | 23.6 | 210 | 0 | 193 |
| Example 3 | 19,900 | 83 | 6.3 | 20 | 22.2 | 200 | 0 | >200[a] |
| Example 4 | 19,800 | 83 | 5.0 | 30 | 21.9 | 200 | 0 | >200[a] |
| Example 5 | 18,800 | 84 | 2.9 | 20 | 21.0 | 190 | 0 | 173 |
| Example 6 | 20,000 | 83 | 5.5 | 20 | 23.0 | 180 | 1.8 | >200[a,b] |
| Example 7 | 19,800 | 84 | 6.1 | 20 | 21.4 | 195 | 4.4 | >200[a,b] |
| Example 8 | 20,200 | 83 | 7.8 | 30 | 21.0 | 210 | 6.0 | >200[a,b] |
| Comparative Example 1 | 32,000 | 77 | — | — | 18.6 | 180 | 0 | 29 |

[a] Sheet was not fractured.

[b] Measuring samples were fractured in some cases in the second drawing measurement at a magnification of 10-fold or less (60-fold or less as total drawing magnification).

and a step of subjecting the polymer obtained by said step of polymerizing olefins including ethylene to a temperature of not less than 100° C. and not more than a melting point of the polymer for 15 minutes to 24 hours.

6. A method for producing the ethylene polymer particles as described in claim 1, comprising:
- (a) a step of producing an ethylene polymer having an intrinsic viscosity [η] of not less than 2 dl/g and less than 10 dl/g, and then
- (b) a step of producing an ethylene polymer having an intrinsic viscosity [η] of not less than 5 dl/g and not more than 35 dl/g, and
- (c) a step of subjecting the polymer obtained by the steps (a) and (b) to a temperature of not less than 100° C. and not more than a melting point of the polymer;

wherein the weight ratio of the ethylene polymer produced in the step (a) to the ethylene polymer produced in the step (b) is 5/95 to 50/50; the intrinsic viscosity [η] of the ethylene polymer produced in the step (b) is calculated from the intrinsic viscosity [η] of the ethylene polymer produced in the step (a), the intrinsic viscosity [η] of the ethylene polymer particles, and the weight ratio of the ethylene polymer produced in the step (a) to the ethylene polymer produced in the step (b); and the intrinsic viscosity [η] of the ethylene polymer produced in the step (a) is lower than the intrinsic viscosity [η] of the ethylene polymer produced in the step (b).

7. A molded article obtained by molding the ethylene polymer particles as described in claim 1 by an ultrahigh molecular weight polyethylene molding method.

8. The molded article according to claim 7, obtained by a solid phase drawing molding method.

* * * * *